(12) United States Patent
Moskovich et al.

(10) Patent No.: US 10,089,278 B2
(45) Date of Patent: Oct. 2, 2018

(54) DEVICE AND METHOD FOR COMPUTING A FUNCTION VALUE OF A FUNCTION

(75) Inventors: Ilia Moskovich, Kiriat-Gat (IL); Roy Glasner, Ramat Gan (IL); Dmitry Lachover, Holon (IL)

(73) Assignee: NXP USA, Inc., Austin, TX (US)

( * ) Notice: Subject to any disclaimer, the term of this patent is extended or adjusted under 35 U.S.C. 154(b) by 1102 days.

(21) Appl. No.: 13/979,859

(22) PCT Filed: Jan. 21, 2011

(86) PCT No.: PCT/IB2011/050276
§ 371 (c)(1),
(2), (4) Date: Jul. 16, 2013

(87) PCT Pub. No.: WO2012/098436
PCT Pub. Date: Jul. 26, 2012

(65) Prior Publication Data
US 2013/0304786 A1  Nov. 14, 2013

(51) Int. Cl.
*G06F 17/10* (2006.01)
*G06F 1/02* (2006.01)

(52) U.S. Cl.
CPC .............. *G06F 17/10* (2013.01); *G06F 1/02* (2013.01); *G06F 2101/10* (2013.01)

(58) Field of Classification Search
CPC ................................. G06F 1/03; G06F 1/0307
USPC ........................................ 708/270, 272, 277
See application file for complete search history.

(56) References Cited

U.S. PATENT DOCUMENTS

| | | | |
|---|---|---|---|
| 5,068,816 A | 11/1991 | Noetzel | |
| 5,224,064 A | 6/1993 | Henry et al. | |
| 6,282,554 B1 * | 8/2001 | Abdallah | H03M 7/24 708/204 |
| 7,747,667 B2 | 6/2010 | Lutz et al. | |
| 2004/0015882 A1 | 1/2004 | Peter Tang | |
| 2004/0107091 A1 | 6/2004 | Lee | |
| 2005/0160129 A1 * | 7/2005 | Endo | G06F 7/544 708/490 |
| 2005/0203980 A1 | 9/2005 | Harrison et al. | |
| 2007/0061389 A1 * | 3/2007 | Hussain | G06F 7/556 708/277 |
| 2009/0113186 A1 * | 4/2009 | Kato | H03M 7/24 712/222 |

(Continued)

OTHER PUBLICATIONS

Finley, Thomas, Floating Point, Apr. 2000, pp. 1-7.*

(Continued)

*Primary Examiner* — Keith E Vicary
*Assistant Examiner* — Emily E Larocque

(57) ABSTRACT

A device is provided for computing a function value of a function F. The device includes a memory, a truncator unit, a selector unit, and an evaluator unit. The memory contains a look-up table comprising a set of entries, each entry having associated with it a domain and an approximation function for approximating F on the associated domain. The truncator unit is arranged to truncate or round a first value X1 to generate a second value X2. The selector unit is arranged to select an entry of the lookup-table according to the second value X2, thus selecting the approximation function that is associated with the selected entry. The evaluator unit is arranged to determine the function value of the selected approximation function at the first value X1.

11 Claims, 7 Drawing Sheets

(56) References Cited

U.S. PATENT DOCUMENTS

2010/0138465 A1    6/2010   Azadet et al.
2010/0198895 A1    8/2010   Azadet et al.

OTHER PUBLICATIONS

Wikipedia, Fixed-Point Arithmetic, Mar. 5, 2010, pp. 1-5.*
Florent, et al: "Multipartite Table Methods", IEEE Transactions on Computers, vol. 54, No. 3, Mar. 2005, pp. 319-330.
International Search Report and Written Opinion correlating to PCT/IB2011/050276 dated Oct. 26, 2011.

* cited by examiner

DEVICE AND METHOD FOR COMPUTING A FUNCTION VALUE OF A FUNCTION

FIELD OF THE INVENTION

This invention relates to a device and a method for computing a function value of a function as described in the accompanying claims.

BACKGROUND OF THE INVENTION

A mathematical function, by definition, assigns a unique function value to any element of a domain on which the function is defined. The function thus maps the domain into a corresponding co-domain. For example, the domain may comprise a set of real-valued or complex-valued numbers. Similarly, the co-domain may comprise a set of real-valued or complex-valued numbers. In another example of practical interest, the domain comprises a set of n-tuples, each n-tuple being a finite sequence of n-values. For example, the function may provide a mapping of a three-dimensional space to a one-dimensional space; for example, to describe an electrostatic potential.

Shown in FIG. 1 is a simple example of a function F. In the example, the function F is defined as the logarithm of X to base 2, wherein X may be any positive real number. In other words, the function F according to the example assigns to any real number X a corresponding value Y so that 2 to the power Y equals X. For example, the function value of F at the input value 8 is three, because 2 to the power 3 equals 8.

In a related example, the function F may be defined on the entire complex plane, or on a portion thereof. The complex plane includes the real axis X shown in the figure. The complex logarithm has a branch cut in the complex plane extending radially outward from the origin. The cut may be chosen along the negative real axis.

There is often a need to evaluate a given mathematical function numerically using a computer. A computer is understood herein to be any kind of suitable computing device. A computer may thus be implemented, for example, by a complex modular architecture, such as commonly used in a personal computer, by a field-programmable gate array (FPGA), or by a dedicated integrated circuit provided e.g. on a single chip. In this disclosure, the term "evaluating a function" means determining the function value of the function for a given input value. The input value may also be referred to as the argument of the function. In a computer, an abstract mathematical value such as the input or output value of a function is represented by a physical state, for example, the state of a register or the state of some other suitable memory unit. For example, any given real number may be represented with a certain degree of accuracy by a specific bit sequence, wherein the bit sequence (itself an abstract quantity) is represented by the physical state of elementary memory units of the device, e.g. flip-flops. In the present disclosure, the terms "value", "digital representation of the value", and "physical representation of the value" as well as equivalent expressions to any one of these expressions are interchangeable, unless indicated otherwise explicitly or implicitly. For example, when a device receives, determines, or generates a value X, it is clear to the person skilled in the art that the device receives, determines, or generates a physical representation of the value X. Typically, a physical representation may be translated directly into a binary sequence representing the value X.

U.S. patent application publication number US 2010/0198895 A1 (Azadet et al.) describes a digital signal processor that uses a reduced look-up table for evaluating a logarithm function. The evaluation is based on a Taylor series approximation.

SUMMARY OF THE INVENTION

The present invention provides a device and a method for computing a function value of a function F as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
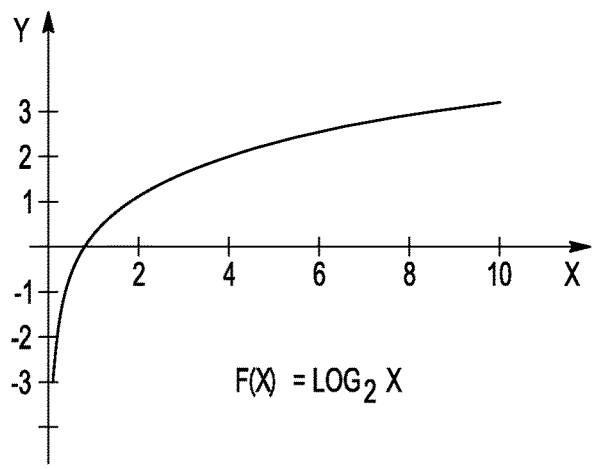
FIG. 1 schematically shows a graph of an example of a function F.
Figure 2:
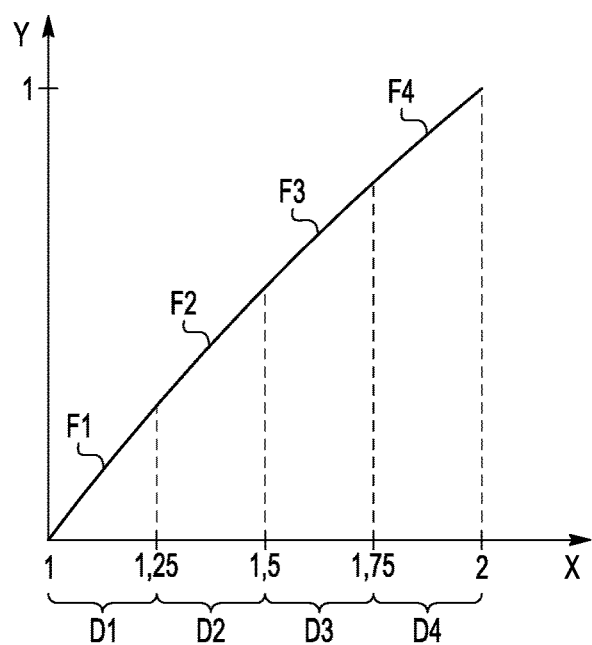
FIG. 2 schematically shows a graph of a piecewise linear function for approximating the function F shown in FIG. 1.

FIG. 2 schematically illustrates, by way of example, a way of approximating the function F shown in FIG. 1, i.e. the logarithm to base two, in view of evaluating the function F numerically. In the example, F may be approximated on the interval [1, 2] by a piecewise linear function F1, F2, F3, F4. The piecewise linear function may be composed of linear functions F1, F2, F3, F4. The linear functions F1, F2, F3, F4 may be used, respectively, on the domains (intervals in the example) D1, D2, D3, D4. More generally, the interval of interest (the interval [1, 2] in the example) may, for example, be divided into a total of $2^N$ adjoining intervals D1, D2, ..., D_N of equal length, where N is a natural number. In the example, D1, D2, D3, and D4 may be the intervals [1; 1.25], [1.25; 1.5], [1.5; 1.75], and [1.75; 2], respectively.

Each of the approximation functions F1, F2, F3, and F4 may, for example, be expressed as Y=A*X+B, wherein X is the argument (input value), Y is the function value (output value), and A and B are constants specific to the respective approximation function. Constants A and constants B relating to different approximation functions may also be referred to herein as A constants and B constants, respectively.

For example, the constant A and the constant B for a given interval [X4, X6] may be determined such that the maximum absolute error ΔY on the interval [X4, X6], that is $$\Delta Y=\max\{abs(A*X+B-F(X))|X4<X<X6\} \quad (Eq.\ 1)$$

is minimum. If the approximation function F is the natural logarithm, the constants A and B may, for example, be determined as follows. The natural logarithm is the logarithm to base E=2.718281 ... where E is the Euler number. The derivation can be easily generalized to any base Q by exploiting the relationship $\ln(x)=\ln(Q)*\log_Q(x)$. Since a logarithm is a convex function, the constants A and B must satisfy the conditions $$A*X4+B-\ln(X4)=\Delta Y \quad (Eq.\ 2)$$

$$A*X5+B-\ln(X5)=-\Delta Y \quad (Eq.\ 3)$$

$$A*X6+B-\ln(X6)=\Delta Y \quad (Eq.\ 4)$$

where X5 is a certain value between X4 and X6. Subtracting equation 2 from equation 4 and adding equation 2 to equation 3 yields $$A=[\ln(X6)-\ln(X4)]/(X6-X4) \quad (Eq.\ 5)$$

$$2*B=\ln(X4)+\ln(X5)-A*(X4+X5) \quad (Eq.\ 6).$$

Inserting these expressions for A and B into equation 3 and setting the first derivative of ΔY zero yields $$X5=1/A \quad (Eq.\ 7).$$

Using equations 5 and 7, equation 6 may be rewritten as $$2*B=[X6*\ln(X4)-X4*\ln(X6)]/(X6-X4)-\ln(A)-1 \quad (Eq.\ 8).$$

Explicit definitions for the two constants A and B have thus been obtained for an arbitrary interval [X4, X6] on which the natural logarithm is to be approximated by the linear function Y=A*X+B.

Alternatively, the constants A and B may be defined for example so as to minimize an average quadratic error on the interval of interest. An average quadratic error is understood to be the square of the difference of the function F and the approximation function, integrated over the interval of interest.

These ideas can be generalized both to functions F other than logarithms and to non-linear approximation functions. For example, F may be a real-valued function defined on a real-valued domain. F may also be a function defined on a multidimensional domain, e.g. a surface or a volume, in which case the constant A may be a matrix, e.g. a gradient of F. Furthermore, any suitable number of approximation functions may be used to approximate a given function F in a piecewise manner. For example, F may be approximated using more than four approximation functions; e.g. using thirty-two approximation functions F1 to F32. Generally speaking, each or at least one of the approximation functions may, for example, minimize a maximum absolute error on the interval on which the respective approximation function is used. Alternatively, each or at least one of the approximation functions may, for example, minimize an average quadratic error on the interval of interest. In both cases, minimizing the error may include minimizing the error under one or more constraints. A constraint may, for example, be that the approximation function be a linear function, as in the example illustrated above with reference to FIG. 2.

Figure 3:
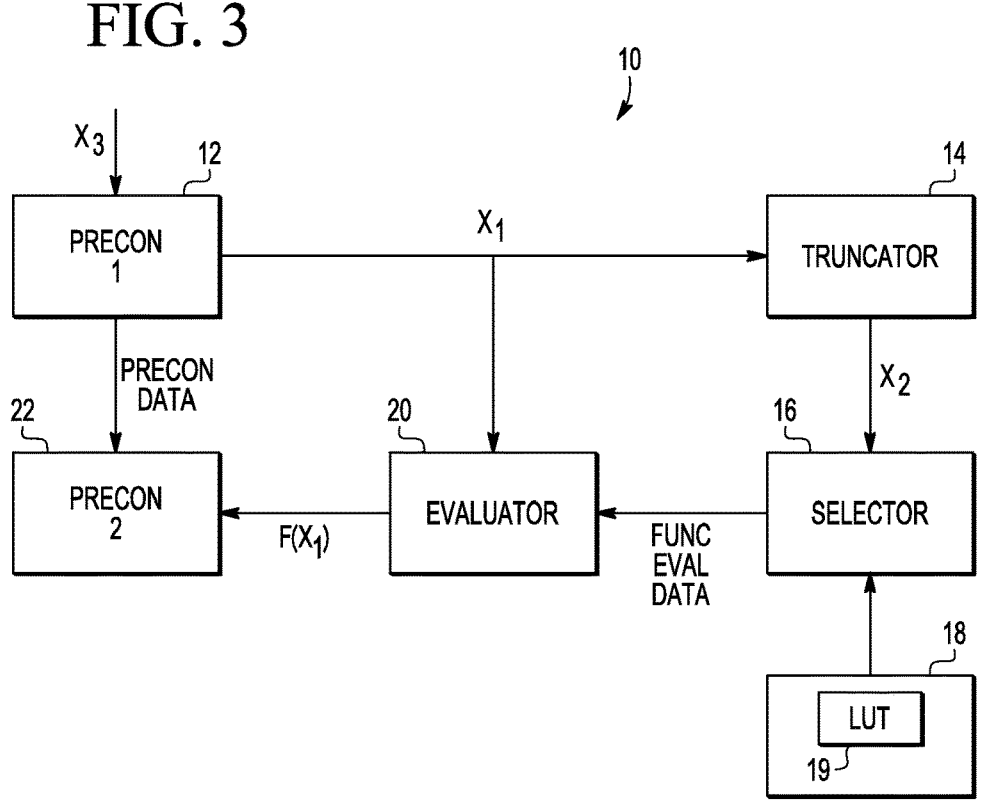
FIG. 3 schematically shows an example of an embodiment of a device for computing a function value of a function F.

Referring now to FIG. 3, an example of a device 10 for computing a function value of a function F is shown. In this example, the device 10 comprises a memory 18, a truncator unit 14, a selector unit 16, and an evaluator unit 20. The device 10 may, for example, be a digital signal processor (DSP), or it may be integrated in a digital signal processor. A DSP is a specialized microcontroller for performing digital operations within a predefined time limit. For example, the device 10 may be arranged to compute the function value within a single clock cycle.

In the example, the memory 18 contains a lookup table 19. The lookup table 19 may comprise a set of entries (further discussed by way of example in reference to FIGS. 4 and 5). Each of these entries may have a domain associated with it and an approximation function for approximating the function F on the associated domain.

In the example, the truncator unit 14 is arranged to truncate or round a first value X1 to generate a second value X2. X1 may, for example, be an input value or a value generated by the device 10. For example, X1 may be a value received via an input, or a value generated from a third value X3. X1 may, for example, be generated from a third value X3 by a preconditioner unit. X3 may, for example, be an input value, or a value generated by some other numerical operation.

The second value X2 may have fewer significant bits than the first value X1, i.e. X2 may be represented by fewer significant bits than X1. For example, the second value X2 may be represented by a binary sequence comprising six bits. Truncating or rounding the first value X1 may provide a particularly fast way of selecting an approximation function that may be suitable for approximating the function F at the first value X1. For example, the truncator unit 14 may be arranged to extract a subset of bits from the first value X1. The extracted subset may exclude a subset of less significant bits of the first value X1. In other words, the truncator unit 14 may be arranged to generate the second value X2 by omitting at least one of the less significant bits of the first value X1. More rigorously speaking, the truncator unit 14 may be arranged to truncate or round a digital representation of the first value X1 to generate a digital representation of a second value X2, wherein the digital representation of the second value X2 may comprise fewer significant bits than the digital representation of the first value X1. For the sake of brevity and in accordance with the remarks made above, no formal distinction is generally made in the present disclosure between a mathematical value and a digital or analog representation of the value, as any mathematical object mentioned in the disclosure may be represented physically, e.g. in a discrete/digital or in a continuous/analog manner or by a combination of both.

The selector unit 16 may be arranged to select an entry of the lookup table 19 according to the second value X2. The selector unit 16 may thus select the approximation function that is associated with the selected entry. The evaluator unit 20 may be arranged to determine the function value of the selected approximation function at the first value X1.

In the example, the device 10 may further comprise a preconditioner unit 12, 22 which may comprise a first module 12 and a second module 22. The first module 12 may be arranged to determine the first value X1 from a third value X3 such that the first value X1 is within a predefined range, e.g by applying a transformation to X3. The second module 22 may be arranged to determine an approximate or exact function value of the function F at the third value X3 from the determined function value of the selected approximation function at the first value X1, e.g. by applying a back-transformation to the function value of the selected approximation function.

For example, the function F may be the logarithm to a base Q. The base Q may equal two (Q=2), for example. This choice (Q=2) may be particularly convenient if the device 10 uses binary logic. The first module 12 may, for example, be arranged to determine the first value X1 and an exponent P1 from the third value X3 such that X3=X1*QP1. The symbol  means "to the power of", i.e. $Q**P1=Q^{P1}$. The second module 22 may be arranged to add the exponent P1 to the function value of the selected approximation function at the first value X1. For example, the first module 12 may be arranged to determine the exponent P1 such that the first value X1 is confined to one of the following intervals:

[1/Q, 1); (1/Q, 1]; [1, Q); and (1, Q].

Referring back to FIG. 2, the plot shown therein corresponds to the choice Q=2. In fact, the input value X1 may be confined to the interval [1, 2) represented in FIG. 1. For example, if X1=1.417, the truncator unit may generate as second value X2=1.25, the selector unit 16 may accordingly select approximation function F2, and the evaluator unit 20 may compute the function value F2(X1) with X1=1.417.

From the above, it is apparent that at least one of the approximation functions (F1 to F4 in the example discussed in reference to FIG. 2) may be a linear function. Notably in this case, the evaluator unit 20 may comprise a multiply-accumulate (MAC) unit for evaluating said linear function. Thus, the linear function may be evaluated particularly rapidly, for example, within a time interval shorter than a clock cycle. More generally, the MAC unit may be arranged to evaluate the MAC A*X1+B, or A*X1−B, for any constants A and B read from the look-up table.

Alternatively, at least one of the approximation functions may be a non-linear function, e.g. a second-order polynomial. For example, the evaluator unit 20 may comprise two multiply-accumulate units coupled in series for evaluating the second-order polynomial.

Figure 4:
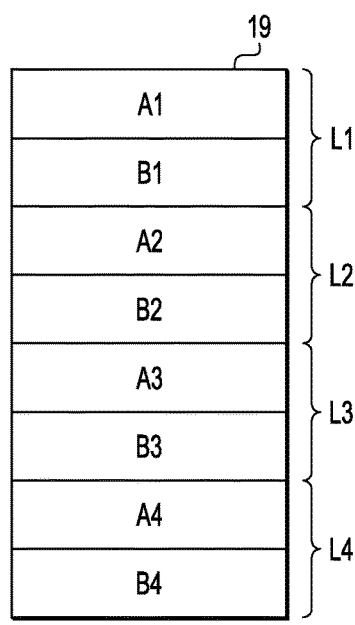
FIG. 4 schematically shows an example of an embodiment of a lookup table.

Referring now to FIG. 4, an example of a lookup table 19 as contained in the memory 18 shown in FIG. 3 is illustrated in a schematic and simplified manner. In the example, the lookup table 19 may comprise a set of entries L1, L2, L3, and L4. In practice, the lookup table 19 may, of course, comprise more than four entries. For example, the lookup table 19 may comprise a total of $2^N$ entries, N being a natural number, e.g. 16, 32, 64, or 128 entries. Each of said entries L1, L2, L3, and L4 may have associated with it a domain D1, D2, D3, and D4, respectively (see FIG. 2) and an approximation function F1, F2, F3, F4 (see again FIG. 2) for approximating a given function F on the associated domain. Entry L1 may thus be associated with domain D1 and approximation function F1. Entry L2 may be associated with domain D2 and approximation function F2, and so on. As mentioned above, at least one of the approximation functions F1, F2, F3, F4 may minimize a maximum absolute error on the associated domain or an average quadratic error on the associated domain. Each entry may contain data for defining the associated approximation function, or for evaluating the associated approximation function. For example, each entry L1, L2, L3 and L4 may contain data defining a constant A and a constant B as described above in reference to FIG. 2. For example, entry L1 may define a first constant A1 and a second constant B1 for enabling the evaluator unit 20 to compute the value A1*X1+B1. Similarly, entry L2 may define constants A2 and B2 for enabling the evaluator unit 20 to compute the value A2*X1+B2. Entries L3 and L4 may be defined analogously. The domains D1, D2, D3, D4 associated with subsequent entries L1, L2, L3, L4 may be adjoining intervals, as illustrated in FIG. 2 by way of example. This may allow a particularly efficient hardware implementation. However, the entries may, in principle, be arranged in any order.

Figure 5:
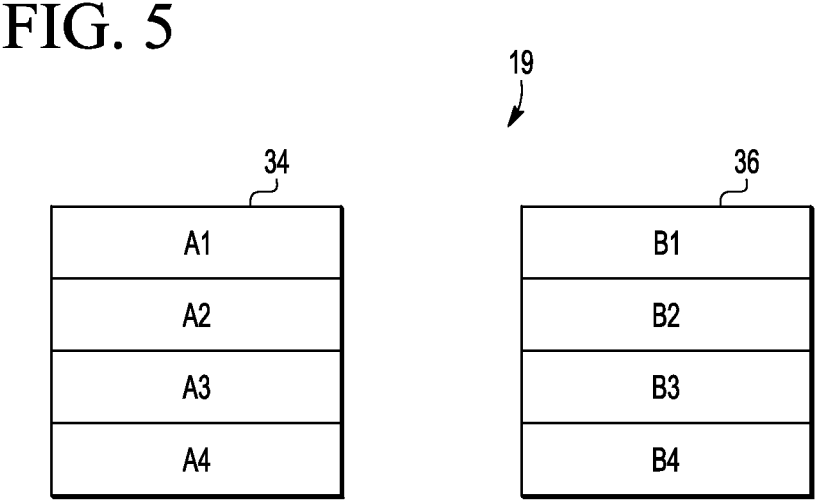
FIG. 5 schematically shows another example of an embodiment of a lookup table.

Referring now to FIG. 5, an example of an alternative embodiment of a lookup table as may be contained in the memory 18 is shown. The lookup table 19 shown in the figure comprises, by way of example, a first subtable 34 and a second subtable 36. Each entry (entries L1 to L4 in FIG. 4) may be distributed over the first subtable 34 and the second subtable 36. In the example, the first subtable 34 may contain the constants A1 to A4, while the second subtable 36 may contain the constants B1 to B4, for enabling the evaluator unit 20 to compute function values of the respective approximation functions F1 to F4. For example, each of the constants A1 to A4 may be represented by a bit sequence comprising a total of 18 bits, while each of the constants B1 to B4 may be represented by a bit sequence comprising a total of 17 bits.

The constants A1 to A4 and B1 to B4 discussed above with reference to FIGS. 4 and 5 may be represented, for example, in fixed-point format or in floating-point format. In an example, the A constants are each represented by an 18-bit sequence using fixed-point format, while the B constants are each represented by a 17-bit sequence using fixed-point format. More generally, at least one of the entries of the lookup table 19 may comprise at least one number in fixed-point format, and the device 10 may comprise a fixed-point to floating-point converter for converting said number to floating-point format. Furthermore, at least one of the entries of the lookup table 19 may comprise at least one number in floating-point format, and the device 10 may comprise a floating-point to fixed-point converter for converting said number to fixed-point format. The fixed-point to floating-point converter or the floating-point to fixed-point converter may be integrated for example in the selector unit 16. The fixed-point to floating-point converter may be responsive to an index indicative of the selected entry of the lookup table. Similarly, the floating-point to fixed-point converter may be responsive to an index indicative of the selected entry. Said index may, for example, be the second value X2. Thus, a format conversion of data contained in the lookup table may be performed particularly efficiently. Furthermore, the device 10 may support input and output data in fixed-point format as well as input and output data in floating-point format, in both cases using the same look-up table 19, e.g. using an entry that is in fixed-point format for both fixed-point format input/output and floating-point input/output.

Figure 6:
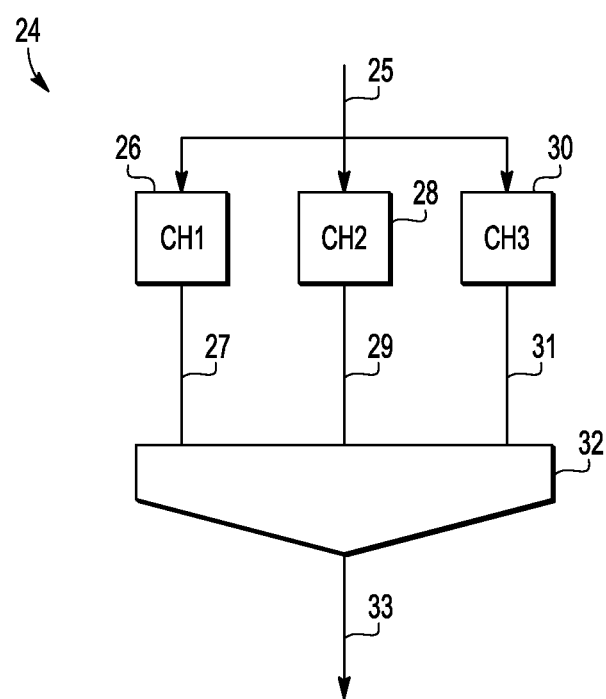
FIG. 6 schematically shows an example of an embodiment of a fixed-point to floating-point converter.

Referring now to FIG. 6, an example of a format converter 24 is illustrated in a schematic and simplified manner. The format converter 24 may be a fixed-point to floating point converter or a floating-point to fixed-point converter. The format converter 24 may comprise e.g. an input unit for receiving an input number 24, a set of at least two channels 26, 28, 30, each of which channels may be configured to generate an output number 27, 29, 31 from the input number 25 by a channel-specific method, and a multiplexer 32 for selecting one of the generated output numbers 27, 29, 31. The multiplexer 32 may thus output an output number 33 which is one of said output numbers 27, 29, and 31. The multiplexer 32 may select the output number according to an index indicative of the selected entry of the lookup table (i.e. one of the entries L1 to L4) or according to one or more characteristics of the input number 25 or according to a combination of both. For example, such a characteristic may be a specified range to which the input number 25 pertains. In the example shown, the format converter 24 comprises three channels 26, 28, and 30. Alternatively, the format converter may comprise only two channels or more than three channels. These and other aspects are described in greater detail, by way of example, in reference to FIGS. 7 and 8.

Figure 7:
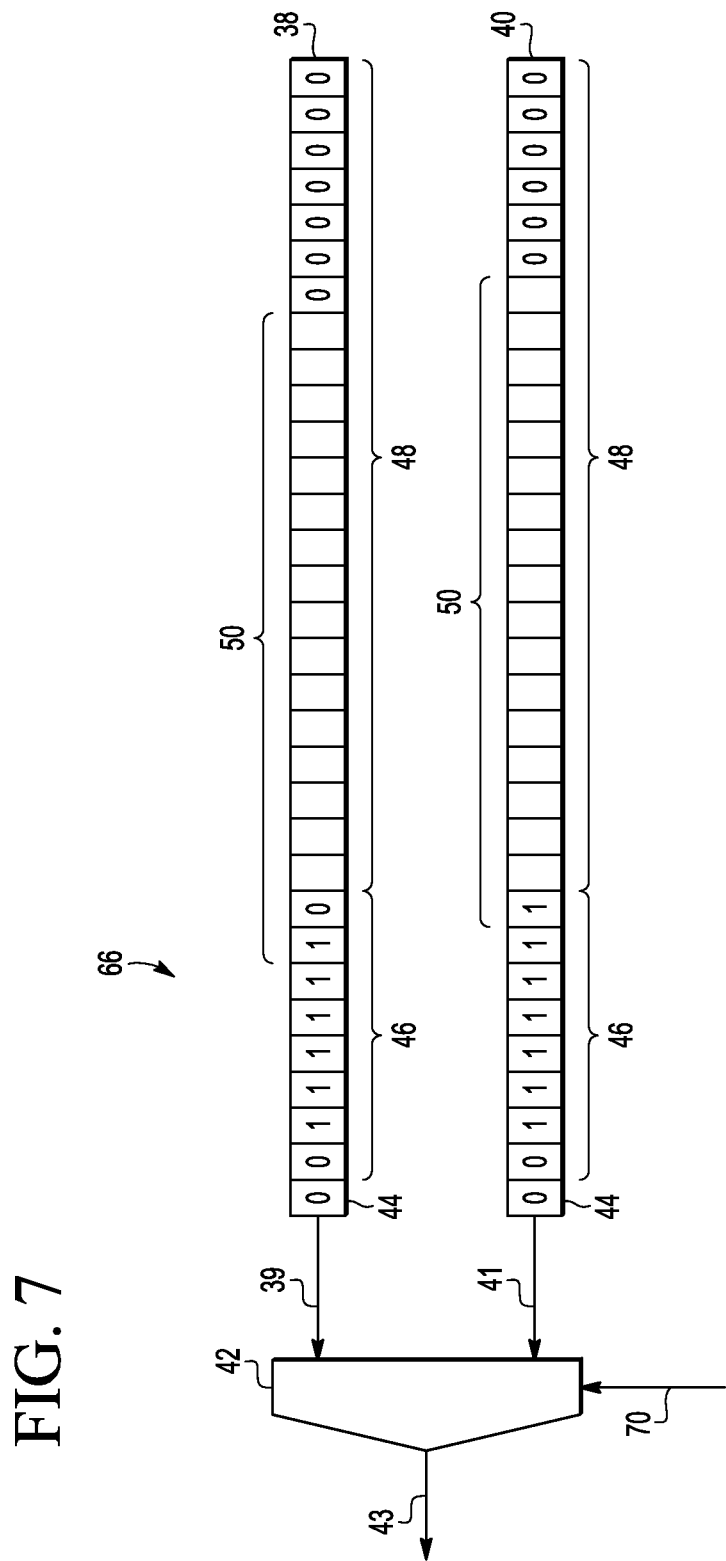
FIG. 7 schematically shows another example of an embodiment of a fixed-point to floating-point converter.

FIG. 7 schematically shows an example of an embodiment of a first fixed-point to floating-point converter 66. The converter 66 may be arranged to convert any one of the A constants retrieved from the lookup table 19 to floating-point format. The converter 66 may be integrated in e.g. the selector unit 16 or the evaluator unit 20 (see FIG. 3). The converter 66 comprises e.g. a first memory block 38, a second memory block 40, and a multiplexer 42. In the example shown, each of the memory blocks 38 and 40 may be a register, e.g. a 32-bit register. The multiplexer 42 may be arranged to receive the binary sequence 39 and the binary sequence 41 stored in the first register 38 and the second register 40, respectively. For the purpose of the present description, the bits of each register 38, 40 may be numbered one to thirty-two, counting them from the left to the right in the figure (their numbering is not indicated in the Figure for the sake of clearness). Each of the registers 38 and 40 may comprise a sign bit 44 (bit number one), an eight-bit sequence 46 (bits number two to nine) for representing an exponent, and a 23-bit sequence 48 (bits number ten to thirty-two) for representing a mantissa. Depending on the details of the implementation, interpreting the mantissa 48 may or may not involve a hidden bit.

The converter 66 may operate e.g. as follows. One of the A constants contained in the lookup table 19, for example, the constant A3 shown in FIG. 5, may be read from the lookup table 19 and copied to a segment 50 of the first register and of the second register, respectively. In the shown example, segment 50 may comprise a total of 18 bits. In this example, segment 50 of the first register 38 comprises bits number eight to twenty-five, two of which are part of the exponent 46, the rest of which form part of the mantissa 48. Segment 50 of the second register 40 may comprise bits number nine to twenty-six. Segment 50 having been filled with the binary representation of the A constant (e.g. A3), the exponents 46 of the first register 38 and the second register 40 may be filled with predefined values as illustrated in the figure, e.g. with the binary sequences 01111110 and 01111111, respectively. Alternatively, the exponents 46 may have fixed values, e.g. the values shown in the figure, and only bits number ten to twenty-five (that is, the blank bits in segment 50) may be filled with a binary sequence representing the A constant (e.g. A3), so the exponents are not overwritten in this case.

In the example, the binary sequence representing the constant A3, as stored in the lookup table 19, may have either two or one leading zeros. For example, constants A1 and A2 may have two leading zeros, whereas constants A3 and A4 may have only one leading zero (see FIG. 5). Depending on the number of leading zeros of the binary sequence representing the A constant, the first register 38 or the second register 40 may contain a correct floating-point representation of the A constant retrieved from the table 19. The multiplexer (MUX) 42 may receive a signal 70 for enabling the multiplexer 42 to select the correct one of binary sequence 38 and binary sequence 41 contained in the first register 38 and the second register 40, respectively. For example, signal 70 may indicate the above-mentioned truncated or rounded value X2. Since X2 may serve as an index to the lookup table 19, the multiplexer 42 may be able to select the correct bit sequence among the bit sequences 39 and 41. The multiplexer 42 may output the selected bit sequence 43, that is either bit sequence 39 or bit sequence 41. Alternatively, signal 70 may, for example, indicate the value of bit number ten of register 40 (in the figure, this is the left-most blank bit in register 40). If bit number ten of register 40 is zero, the multiplexer 40 may select the bit sequence 39; otherwise, it may select the bit sequence 41. Alternatively, signal 70 may, for example, indicate the value of bit number two of the A constant, from which the value of bit number ten of register 40 may be copied.

Figure 8:
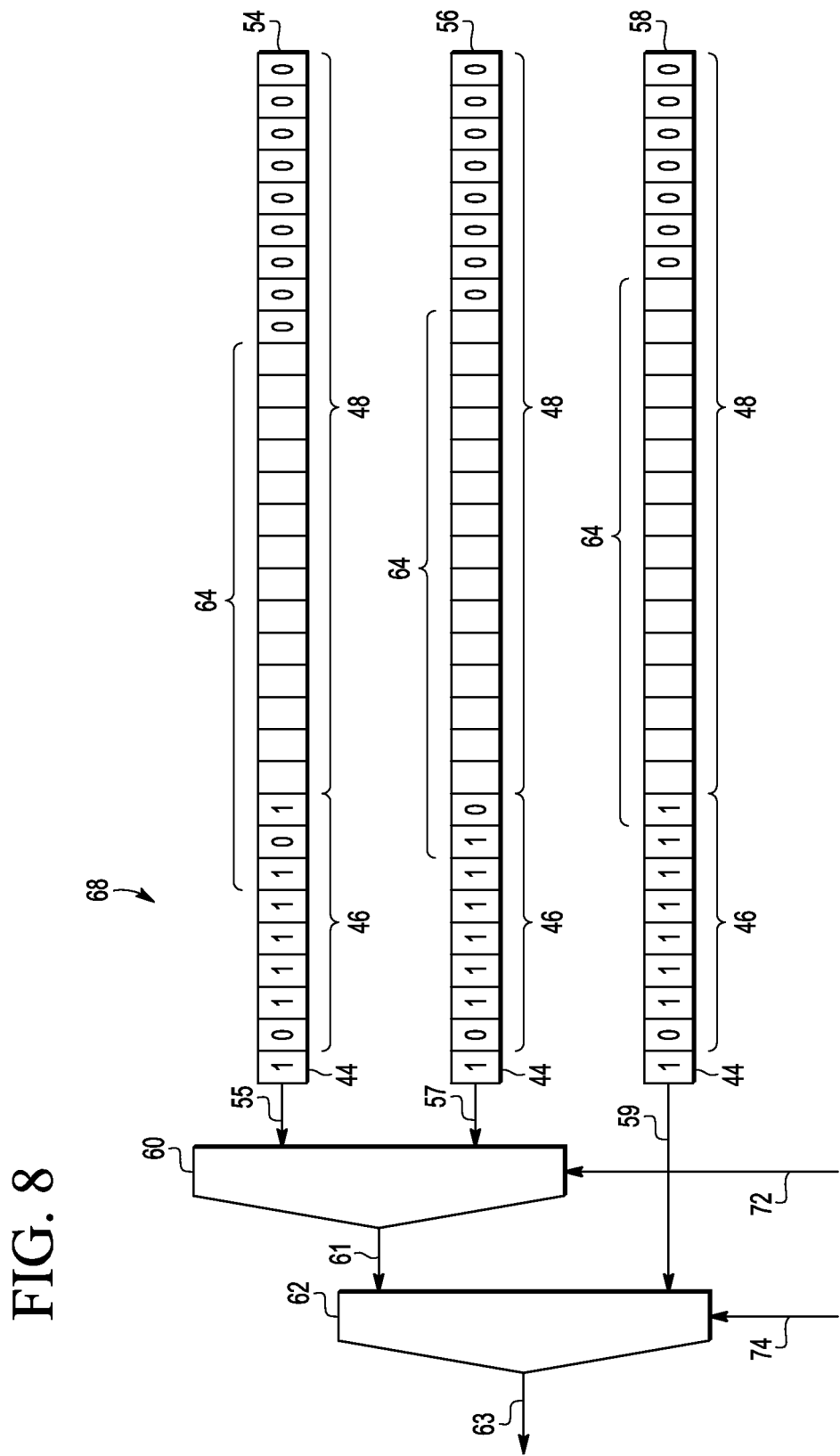
FIG. 8 schematically shows yet another example of an embodiment of a fixed-point to floating-point converter.

Referring to FIG. 8, an example of embodiment of a second fixed-point to floating-point converter 68 is shown. The converter 68 may comprise a first memory block 54, a second memory block 56, a third memory block 58, a first multiplexer 60, and a second multiplexer 62. It may be noted that first MUX 60 and second MUX 62 may be integrated in a single MUX 60, 62. The operating principle of the second converter 68 may be similar to that of the first converter 66 described above with reference to FIG. 7. In particular, each of the memory blocks 54, 56, and 58 may be a 32-bit register. Each of the registers 54, 56, and 58 may comprise a sign bit 44 (bit number one), an exponent 46 (bits number two to nine), and a mantissa 48 (bits number ten to thirty-two). A binary sequence representing, for example, the constant B3 (see FIG. 5) may be copied to the respective segment 64 of the first, second, and third registers 54, 56, 58, and the exponents 46 may be filled with their respective values as shown in the present figure. Alternatively, only the blank bits in the figure may be filled with a representation of the B constant (B3 in the example). Depending on the number of leading zeros in the binary representation of the B constant stored in table 19, the first register 54, the second register 56, or the third register 58 may contain a correct floating-point representation of the B constant. For example, signals 72 and 74 may indicate the values of bit number 10 (in the figure, the leftmost blank bit) of the second register 56 and the third register 58, respectively. If bit number ten of the third register 58 has the value one, the second multiplexer 62 may output as output signal 63 the bit sequence 59, that is the content of the third register 58; otherwise the second multiplexer 62 may output the output 61 provided by the first multiplexer 60. If bit number ten (i.e., the leftmost blank bit in the figure) of the second register 56 has the value one, the first multiplexer 60 may output as output 61 the bit sequence 57 contained in the second register 56; otherwise the first multiplexer 60 may output as output signal 61 the bit sequence 55 contained in the first register 54.

The signals 70 (see FIG. 7), as well as signals 72 and 74 (see FIG. 8) may be generated directly from the selected entry in the lookup table 19. Alternatively, the signal 70 may be generated e.g. from register 40 after copying the A constant to that register, while signals 72 and 74 may be generated e.g. from registers 56 and 58, respectively, e.g. after copying the B constant to these registers.

Figure 9:
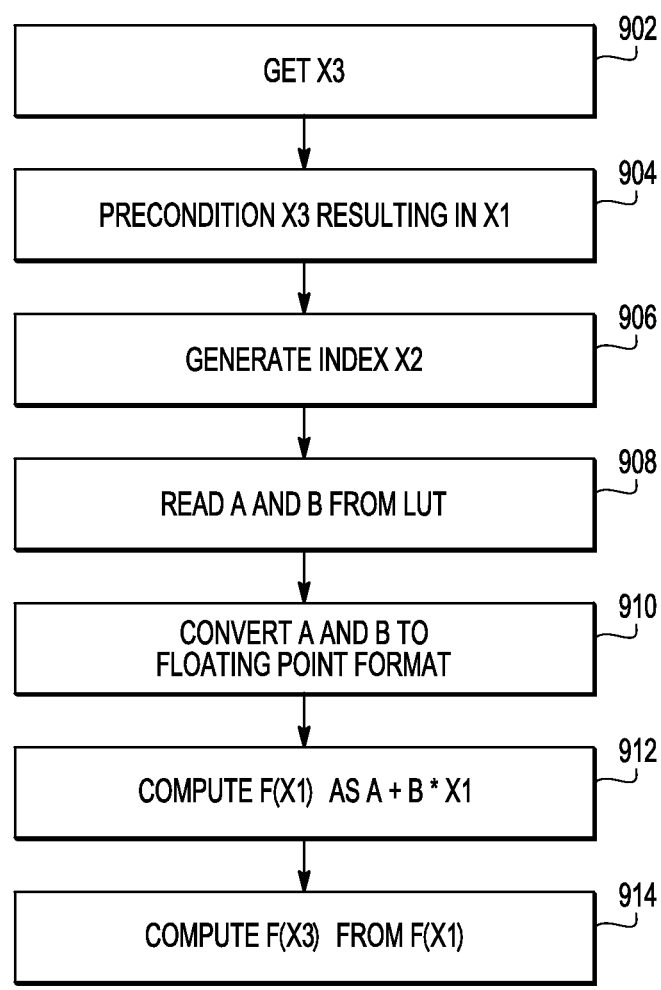
FIG. 9 shows a flow chart of an example of an embodiment of a method for computing a function value of a function F.

Referring now to FIG. 9, a method of computing a function value of a function F is illustrated in a simplified manner by way of example. The method may comprise providing a memory 18 containing a look-up table 19. The look-up table 19 may comprise a set of entries (L1; L2; L3; L4), each of which entries having associated with it a domain (D1; D2; D3; D4) and an approximation function (F1; F2; F3; F4) for approximating the function F on the associated domain. The method may further comprise: truncating or rounding a first value X1 to generate a second value X2 (step 906); selecting an entry of the lookup-table 19 according to the second value X2 (step 908), thus selecting the approximation function (F1; F2; F3; F4) that is associated with the selected entry (L1; L2; L3; L4); and determining the function value of the selected approximation function (F1; F2; F3; F4) at the first value X1 (step 912).

An example of the method may be described more specifically as follows with additional reference to FIGS. 3, 4, and 5. In step 902, a third value X3 may be inputted to the first preconditioner module 12. Preconditioner module 12 may determine a first value X1 and an exponent P1 from the third value X3 such that $X3=X1*Q^{P1}$ (step 904). The truncator unit 14 may truncate or round the first value X1 to generate a second value X2 (step 906). X2 may have fewer significant bits than X1. The selector unit 16 may select an entry of the lookup table 19 according to the second value X2. The selector unit 16 may thus select the approximation function that is associated with the selected entry. In the example, the approximation function may be selected by reading a constant A and a constant B from the lookup table 19 (step 908). Constants A and B may define e.g. a linear function. Constants A and B may be converted e.g. from fixed-point to floating-point format (step 910). For example, A and B may be converted as described above with reference to FIGS. 7 and 8. The evaluator unit 20 may then determine the function value of the selected approximation function at the first value X1 (step 912). In the example, the evaluator unit may determine the function value of the selected approximation function by performing a multiply-accumulate operation, e.g. A*X1+B or A*X2-B. Finally, the second preconditioner module 22 may add the exponent P1 to the determined function value of the selected approximation function (step 914), thus generating an approximate function value F(X3) of the function F at the third value X3. The approximate function values F(X1) and F(X3) of F thus generated may be exact to machine precision, i.e. no higher accuracy may be possible with the available number of bits.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Figure 10:
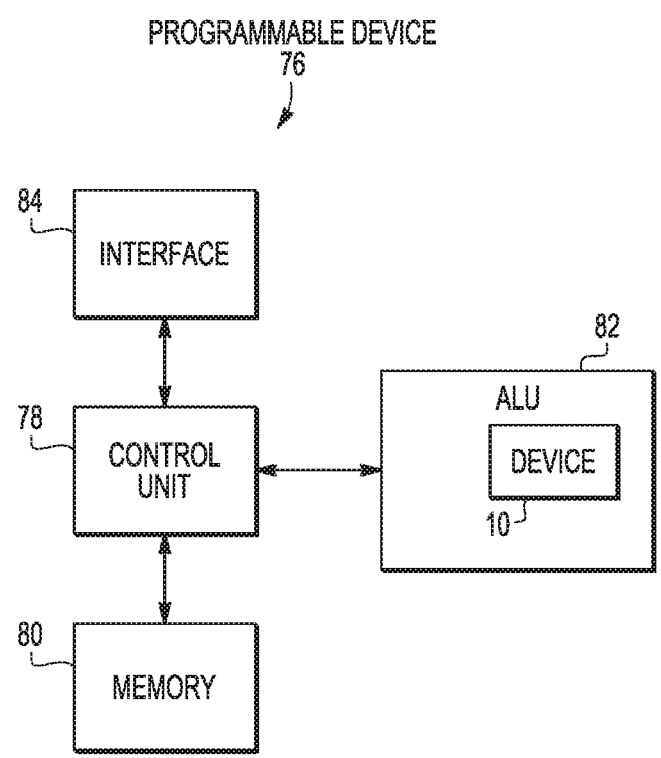
FIG. 10 schematically shows an example of an embodiment of a programmable device.

Referring now to FIG. 10, there is illustrated, in a simplified manner, an example of an embodiment of a programmable device 76. The programmable device 76 may, for example, be a microcomputer, e.g. in a communication apparatus. In the example shown, the programmable device 76 comprises a control unit 78 and an arithmetic logic unit (ALU) 82. The programmable device 76 may further comprise e.g. a memory 80 and an interface 84 for interacting with another device (not shown) or with a user (not shown). The memory 80 may contain for instance both data and executable instructions forming a program. Each of memory 80, ALU 82, and interface 84 may be coupled to the control unit 78 for transferring data from and to the control unit 78.

The ALU 82 may be arranged to perform logical and/or numerical operations in response to control signals generated by the control unit 78. For example, the program residing in memory 80 may contain an instruction for instructing the control unit 78 to compute the sum of two values stored in the memory 80. The control unit 78, in response to fetching the instruction from the memory 80, may control the ALU 82 to compute the sum of the two values.

The ALU 82 may further comprise a device 10 for computing the function value of a defined function F as described above in reference to FIGS. 1 to 9. For example, the program residing in memory 80 may further contain an instruction for instructing the control unit 78 to evaluate the function F for a value X3 stored in the memory 80. The control unit 78, in response to fetching the instruction, may control the ALU 82 to generate the function value F(X3) using the dedicated device 10.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may, for example, be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the truncator unit 14, the selector unit 16, and the memory 18 may be implemented in single integrated circuit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the preconditioner unit 12, 22, the truncator unit 14, the selector unit 16, the memory 18, and the evaluator unit 20 may be located in a single device, e.g. a digital signal processor. Alternatively, the examples may be implemented as any number of separate integrated circuits or separate devices interconnected with each other in a suitable manner. For example, a digital signal processor might comprise only the truncator unit 14, the selector unit 16, the memory 18, and the evaluator unit 20. A preconditioner unit 12, 22 could be optionally coupled to the digital signal processor.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the description and in the claims, the symbol "=" means "equal to". The symbol "<" means "less than". The symbol ">" means "greater than". The symbol "=<" means "less than or equal to". The symbol ">=" means "greater than or equal to". The interval [A, B] is the set of real numbers X such that A=<X=<B. The interval (A, B] is the set of real numbers X such that A<X=<B. The interval [A, B) is the set of real numbers X such that A=<X<B. The interval (A, B) is the set of real numbers X such that A<X<B.

In the figures, any arrow in a device plot may represent a transfer in the direction indicated by the arrow, unless stated otherwise. Depending on the context, the transfer may, for example, be an electric charge transfer, an information or data transfer, a signal transfer, or any other kind of transfer. Any arrow may, in addition, represent a connection for allowing the transfer represented by the arrow. Thus, any arrow may represent both the transfer and the connection. Depending on the kind of transfer, a connection may be provided by e.g. a data bus, a pair comprising a transmitter and a receiver, an electric conductor, or any other suitable connection. A connection is not necessarily provided by a distinct component. The direction of an arrow does not indicate a unidirectional connection, unless stated otherwise. In other words, any connection represented by a unidirectional arrow may be a unidirectional connection or a bidirectional connection, unless stated otherwise.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A device for computing a function value of a function F, comprising:
   a memory storing a look-up table comprising a first set of entries storing numbers in a first fixed-point format and a second set of entries storing numbers in a second fixed-point format, each entry of the first and second set of entries of which entries having associated with a corresponding domain and a corresponding approximation function for approximating the function F on the associated domain;
   a truncator unit arranged to truncate or round a first value X1 to generate a second value X2;
   a selector unit, coupled to the truncator unit and the memory, and arranged to select an entry of the look-up table according to the second value X2, thus selecting the approximation function that is associated with the selected entry;
   a first fixed-point to floating-point converter comprising a first register, a second register, and a first multiplexer, the first register and the second register coupled to the first multiplexer and the first multiplexer configured to select contents of the first or second register, wherein the first register stores a first representation of a first set number of the first set of entries, the second register stores a second representation of the first set number of the first set of entries, and the first multiplexer is configured to select one of the first or second registers to output a floating-point representation of the first set number based on one or more of an index of the first set of entries or a characteristic of the first set number;
   a second fixed-point to floating-point converter comprising a third register, a fourth register, and a second multiplexer, the third register and the fourth register coupled to the second multiplexer and the second multiplexer configured to select contents of the third or fourth register, wherein the third register stores a first representation of a second set number of the second set of entries, the fourth register stores a second representation of the second set number of the second set of entries, and the second multiplexer is configured to select one of the third or fourth registers to output a floating-point representation of the second set number based on one or more of an index of the second set of entries or a characteristic of the second set number; and
   an evaluator unit, coupled to the selector unit, and arranged to determine the function value of the selected approximation function at the first value X1.

2. The device as set forth in claim 1, wherein the truncator unit is arranged to extract a subset of bits from the first value X1.

3. The device as set forth in claim 1, wherein the domains associated with subsequent entries are adjoining intervals.

4. The device as set forth in claim 1, wherein at least one of the approximation functions minimizes
   a maximum absolute error on the associated domain, or
   an average quadratic error on the associated domain.

5. The device as set forth in claim 1, wherein at least one of the approximation functions is a linear function.

6. The device as set forth in claim 5, wherein the evaluator unit comprises a multiply-accumulate unit for evaluating said linear function.

7. The device as set forth in claim 1, comprising a preconditioner unit which comprises
   a first preconditioner arranged to determine the first value X1 from a third value X3 such that the first value X1 is within a predefined range, and
   a second preconditioner arranged to determine an approximate or exact function value of the function F at the third value X3 from the determined function value of the selected approximation function at the first value X1.

8. The device as set forth in claim 1, wherein the function F is the logarithm to a base Q.

9. The device as set forth in claim 8, wherein Q equals two.

10. The device as set forth in claim 8, comprising a preconditioner unit which comprises
    a first preconditioner arranged to determine the first value X1 and an exponent P1 from a third value X3 such that $X3=X1*Q**P1$, and
    a second preconditioner arranged to add the exponent P1 to the determined function value of the selected approximation function at the first value X1.

11. The device as set forth in claim 1, integrated in a digital signal processor.

* * * * *